United States Patent [19]

Odell

[11] Patent Number: 5,698,665

[45] Date of Patent: Dec. 16, 1997

[54] POLYCARBONATE PROCESSES WITH SUPERCRITICAL CARBON DIOXIDE

[75] Inventor: Peter G. Odell, Mississauga, Canada

[73] Assignee: Xerox Corporation, Stamford, Conn.

[21] Appl. No.: 706,944

[22] Filed: Sep. 3, 1996

[51] Int. Cl.$^6$ .................................................. C08F 6/00
[52] U.S. Cl. .......................... 528/480; 528/196; 528/198; 528/483; 528/491; 528/497
[58] Field of Search .................................... 528/196, 198, 528/480, 483, 491, 497

[56] References Cited

U.S. PATENT DOCUMENTS

| | | | |
|---|---|---|---|
| 3,590,000 | 6/1971 | Palermiti et al. | 252/62.1 |
| 4,797,339 | 1/1989 | Marayama et al. | 430/109 |
| 4,983,488 | 1/1991 | Tan et al. | 430/137 |
| 4,996,127 | 2/1991 | Hasegawa et al. | 430/109 |
| 5,206,108 | 4/1993 | Felder et al. | 430/137 |
| 5,229,486 | 7/1993 | Paul et al. | 528/483 |

*Primary Examiner*—Terressa Mosley
*Attorney, Agent, or Firm*—E. O. Palazzo

[57] ABSTRACT

A process for the preparation of polycarbonates which comprises the reaction of a bisphenol, an arylcarbonate and a catalyst, which reaction is accomplished by heating said bisphenol, said arylcarbonate and said catalyst, in the presence of supercritical carbon dioxide, and subsequently extracting byproducts with supercritical carbon dioxide.

28 Claims, No Drawings

POLYCARBONATE PROCESSES WITH SUPERCRITICAL CARBON DIOXIDE

BACKGROUND OF THE INVENTION

The present invention is directed to polycarbonates, and more specifically, to processes for the preparation of polycarbonates. More specifically, the present invention relates to processes for the preparation of certain polycarbonates, such as PC(Z), by melt condensation, and wherein there is selected for the removal of undesirable byproducts, such as phenols, supercritical carbon dioxide. The polycarbonates resulting can be selected as resin binders for photogenerating pigments, or hole transport molecules in layered photoconductive imaging members, reference for example U.S. Pat. No. 4,265,990, the disclosure of which is totally incorporated herein by reference.

Processes for the preparation of polycarbonates by interfacial polymerization, wherein there is selected bisphenol, phosgene, and methylenechloride, are known. Also known are melt polycondensation processes for the preparation of polycarbonates wherein bisphenol, and a diphenylcarbonate is selected. With these processes, there are obtained, for example, high viscosity polycarbonates, such as for example greater than $10^6$ centipoise, and such viscosities prevent the weight average molecular weight of the polycarbonates from exceeding 30,000 Daltons without deleterious broadening of the molecular weight distribution, and phosgene is needed for the interfacial polymerization, and moreover, the different solubilities of different bisphenol salts effectively prevent the formation of random copolymers in the interfacial synthesis. These and other disadvantages are avoided with the processes of the present invention.

SUMMARY OF THE INVENTION

It is an object of the present invention to provide economical processes for the preparation of polycarbonates with many of the advantages illustrated herein.

Another object of the present invention is to provide supercritical carbon dioxide processes for the preparation of polycarbonates.

Further, another object of the present invention is to provide rapid efficient melt polycondensation processes for the preparation of polycarbonates wherein undesirable byproducts, such as phenol, are removed to enable polycarbonates with certain $M_w$ and $M_n$.

Another object of the present invention is to provide supercritical carbon dioxide phosgene free processes for the preparation of polycarbonates.

Also, another object of the present invention resides in the provision processes for the preparation of polycarbonates with a viscosity of from about $10^4$ to about $10^8$ centipoise, an $M_w$ of from about 10,000 to about 200,000 Daltons, and an $M_n$ of from about 4,000 to about 100,000 Daltons.

These and other objects are achieved in embodiments by a process for the preparation of polycarbonates, including substantially pure polycarbonates, which comprises the reaction of a bisphenol, an arylcarbonate and a catalyst, and in which reaction is accomplished by heating, cooling, and subsequently extracting byproducts with supercritical carbon dioxide. More specifically, the present invention relates to a melt polycondensation process for the preparation of polycarbonates which comprises the reaction of a bisphenol, an arylcarbonate and a polymerization catalyst, and which reaction is accomplished by heating, cooling, and subsequently, extracting the byproduct phenol with supercritical carbon dioxide; and a supercritical carbon dioxide melt condensation process for the preparation of a polycarbonate, which comprises adding at least one, for example from 1 to about 5, and preferably from 1 to 3, and more preferably, in embodiments 1 or 2, bisphenol, a diaryl carbonate and a catalyst to a pressure vessel; adding carbon dioxide at pressures of between about 2,500 psi to about 10,000 psi; heating the resulting mixture; stirring the mixture; adding carbon dioxide through one vessel port as carbon dioxide is removed at another second vessel port primarily to maintain the same pressure of from about 2,500 to about 10,000 pressure; depressurizing the removed carbon dioxide through a micrometering valve, such as Model 30VRMM valve available from Autoclave Engineers of Erie, Pa., and wherein the reaction byproduct phenol separates from the carbon dioxide gas.

DETAILED DESCRIPTION OF PREFERRED EMBODIMENTS

The process of the present invention comprises introducing the solid reagents consisting of at least one, or one or more, for example 2, 3, or 4, bisphenols, a diphenylcarbonate and a catalyst into a reactor heated to about 70° C. to allow sufficient solids to melt to allow entry of a helical coil stirrer and subsequent sealing of the reactor. Once sealed, the reactor is pressurized to about 3,000 psi while heating to about 180° to 220° C., and during heating about 300 milliliters of $CO_2$ at 3,000 psi are added while allowing $CO_2$ to escape from the reactor through a heated needle valve. This procedure maintains pressure in the reactor while preventing overpressure due to the heating of the vessel. Other pressure relief arrangements are possible, such as pressure relief valves or computer control of an automated valve. There can be a provision to add carbon dioxide under pressure by either a valve at the reactor top or bottom. A port on the reactor is used to remove $CO_2$ and any extracted material therein, and this is equipped with a shut off valve, followed by a needle valve, followed by a separator vessel, followed by a pressure relief valve, followed by a coalescing filter, and provision is made to heat trace all of these components. The thorough heat tracing is particularly important as the principle condensate is phenol (melting point of 41° C.), thus sufficient heat is to be delivered to the depressurized stream to overcome the expansive cooling of the carbon dioxide and maintain the phenol in a liquid rather than solid form. Failure to do so can at the least plug the extraction lines bringing the reaction to a halt, and may result in pressure build-up in vessels or lines not designed to contain it. An adequate surface temperature for these lines is about 60° C. Subsequent to the coalescing filter, the gas stream enters a water column before entering the atmosphere. The water column can trap any material not removed by the separator or coalescing filter; it also provides a convenient means of monitoring the flow rate; and eliminates the noise of the escaping gas. In embodiments, the carbon dioxide may be recovered, passed through suitable filters to remove any further impurities, and repressurized and reused in further extractions.

Examples of bisphenols that may be used, alone or in combination include (100 parts of total of 1 or more bisphenols, 100 to 150 parts of diphenylcarbonate, 0.05 to 3 parts of catalyst) 4,4'-cyclohexylidene bisphenol, 4,4'-(1,4-phenylenebisisopropylidene)bisphenol, 4,4'-isopropylidene bisphenol, 4,4'-hexafluoroisopropylidene bisphenol, and the like. Suitable catalysts include tetraammonium tetraphenylborate, titanium butoxide, butyltin hydroxide oxide, and the like. Heating is effective in promoting the polymerization at temperatures above about 180° C., and most effective at temperatures of from about 220° C. to about 240° C. Temperatures above about 250° C. continue to accelerate the polymerization but increase the vapor pressure of the bisphenol, and thus its solubility in the supercritical carbon dioxide. Extraction of the bisphenol is to be substantially avoided as it lowers the yield of polymer, and as high melting solids, they rapidly plug the lines and valves leading to the separator causing the extraction and polymerization to substantially cease. The carbon dioxide employed may be of industrial grade or higher quality chromatography grade, and may be employed at a wide variety of pressures, generally the higher the pressure the greater the density and solvating power of the carbon dioxide. Equipment is readily available that provides carbon dioxide pressures of between 2,500 and 10,000 psi. Higher pressures likely will provide more rapid extraction of the phenol but may also begin to extract the bisphenol with the aforementioned undesirable effects. Moreover, higher pressures increase the cost of the pumping system and increase the cost of the reactor vessels. In addition to extracting the phenol, supercritical carbon dioxide plasticizes the polymer melt allowing the use of magnetically coupled stirrers with a maximum torque of 16 inch pounds, while polycondensations in the absence of such plasticization, for example under vacuum, see U.S. Pat. No. 5,242,774, the disclosure of which is totally incorporated herein by reference, required stirrer torque that exceeded 120 foot pounds. The volume of carbon dioxide is an important factor in determining the final molecular weight together with the temperature, catalyst choice and amount. More extraction is accomplished by the use of excess carbon dioxide, for example from 100 to 1,000 milliliters per gram more of the starting bisphenol reactant, or reagent provides weight average molecular weights in excess of 10,000 Daltons. Following the completion of the polymerization, the carbon dioxide pressure is lowered to atmospheric pressure and the solid polymer recovered.

Embodiments of the present invention include a process for the preparation of polycarbonates, which comprises the reaction of a bisphenol, an arylcarbonate and a catalyst, in the presence of supercritical carbon dioxide, which reaction is accomplished by heating said bisphenol, said arylcarbonate and said catalyst, and subsequently extracting byproducts with supercritical carbon dioxide; a melt polycondensation process for the preparation of polycarbonates, which comprises the reaction of a bisphenol, an arylcarbonate and a polymerization catalyst, and which reaction is accomplished by heating, and subsequently extracting the major byproduct phenol with supercritical carbon dioxide; a process wherein the bisphenol is bisphenol A; a process wherein the bisphenol is 4,4'-hexafluoroisopropylidene bisphenol, 1,4-phenylenebisisopropylidene bisphenol, 1-phenylethylidene bisphenol, 4,4'-cyclohexylidene bisphenol, 4,4'-cyclohexylidene-2,2'-dimethyl bisphenol, 4,4'-cyclohexylidene-2,2'-dimethyl bisphenol, 4,4'-isopropylidene-2,2'-dimethyl bisphenol, 1,2-diphenylethylidene)bisphenol, 4,4'-(1-naphthylethylidene) bisphenol, 1,2-phenylenebisisopropylidene)bisphenol, 4,4'-cycloheptylidene bisphenol, 4,4'-(4-t-butylcyclohexylidene) bisphenol; wherein said heating is at a temperature of from about 150° to about 195° C.; a process wherein said heating is at a temperature of about 170° C.; a process wherein the catalyst selected is titanium tetraisopropoxide, butyltin hydroxide oxide, magnesium acetate, zinc acetate, antimony oxide, aluminum di(isopropoxide)acetoacetic ester chelate, tetraphenyl phosphonium tetraphenylborate, or tetramethyl ammonium tetraphenyl borohydride; a supercritical carbon dioxide melt condensation process for the preparation of a polycarbonate, which comprises adding at least one bisphenol, a diaryl carbonate and a catalyst to a pressure vessel; adding supercritical carbon dioxide at pressures of between about 2,500 psi to about 10,000 psi; heating the resulting mixture; stirring the mixture; adding carbon dioxide through one vessel port as carbon dioxide is removed at another second vessel port primarily to maintain a pressure of from about 2,500 to about 10,000 psi, and depressurizing the removed carbon dioxide through a small orifice, and wherein the reaction byproduct phenol separates from the carbon dioxide gas; a process wherein after the reaction byproduct phenol separates from the carbon dioxide gas, there is accomplished continuously heating, stirring and extracting the reactants phenol and excess diphenylcarbonate until the polymer $M_w$ is from about 10,000 to about 250,000 Daltons and the polymer $M_n$ is between about 4,000 and about 150,000 Daltons, followed by depressurizing the vessel and recovering the polymer; and a supercritical carbon dioxide melt condensation process for the preparation of a polycarbonate, which comprises adding bisphenol, a diaryl carbonate and a catalyst to a pressure vessel; adding carbon dioxide at pressures of between about 2,500 psi to about 10,000 psi; heating the mixture to between about 180° C. and about 250° C.; stirring the mixture; adding carbon dioxide through one vessel port as carbon dioxide is removed at another port primarily to maintain the same pressure; and wherein removed carbon dioxide is depressurized through a small orifice and the reaction byproduct phenol separates from the carbon dioxide gas; continuously heating, stirring and extracting until the desired polymer molecular weight is achieved; depressurizing the vessel and recovering the polymer. The undesirable byproducts can in embodiments include mixtures of phenol with other minor amounts, for example 0.05 to 10 weight percent or parts, of contaminants formed from the reaction.

The following Examples are provided.

EXAMPLE I

The polymerization was conducted in a 300 milliliter pressure vessel (Autoclave Engineers, Erie, Pa.) equipped with a helical coil agitator driven by magnetic coupling to an electric motor. There was a provision to add carbon dioxide under pressure by a valve at the reactor top and bottom began with bottom addition and later switched to top addition. A port on the reactor was used to remove $CO_2$ and any extracted material therein, and this port was equipped with a shut off valve, followed by a needle valve, followed by a separator vessel, followed by a pressure relief valve, followed by a coalescing filter. Provision was made to heat trace the shut off valve, needle valve, separator vessel and coalescing filter. Subsequent to the coalescing filter, the gas stream entered a water column before entering the atmosphere. The $CO_2$ was Praxair SFC grade with a helium headspace and was pressurized further by means of an ISCO 500D pump.

The reactants of 38.7 grams of 4,4'-(1,4-phenylene bisisopropylidene)bisphenol (Bispenol P), 31 grams of diphenylcarbonate and the catalyst, 0.1058 gram of tetraammonium tetraphenylborate, were added as powders to the reactor and heated to about 70° C. to allow sufficient solid to melt to allow entry of a helical coil stirrer and subsequent sealing of the reactor. Once sealed, the reactor was pressurized to about 3,000 psi while heating to about 180° to 220° C., and during this period about 300 milliliters of $CO_2$ at 3,000 psi were added while allowing $CO_2$ to escape from the reactor through a heated needle valve. The reaction mixture was stirred at about 60 rpm for a period of 12 hours. The reactor pressure was maintained at about 2,920 psi. The reactor temperature can be maintained at between 205° and 232° C., and for this Example was maintained at 217° to 225° C. for 10 hours, during which time the contents were extracted with about 3,300 milliliters of $CO_2$ at 3,000 psi and about 22° C. (this volume is measured at the ISCO pump). The first 419 milliliters of $CO_2$ were added via the reactor bottom port, the remainder via the top port. At the end of this time the reactor was depressurized and opened, and poly(4, 4'-(1,4-phenylenebisisopropylidene)bisphenol)carbonate was recovered that had an $M_w$ of 27,000 and an $M_n$ of 11,000 with a molecular weight distribution of 2.46. The molecular weights were determined throughout by gel permeation chromatography in THF against polystyrene standards.

EXAMPLE II

The procedure of Example I was repeated except that the amount of catalyst was 0.100 gram, and the temperature profile was 2 hours at 180° C., followed by a 90 minute ramp up to 230° C. where it was maintained for further 3.5 hours. During this time, about 2,500 milliliters of $CO_2$ at 3,000 psi and 22° C. were used to extract the phenol byproduct. The carbon dioxide was introduced by means of a sparge tube that had an opening about 1.5 centimeters above the bottom member of the agitator. A polymer sample, 20 milligrams, was removed from the reactor at the end of this period and found to have an $M_w$ of 5,400 and an $M_n$ of 4,100 with a molecular weight distribution of 1.4. The vessel was resealed and allowed to continue polymerization for a further 6 hours at about 230° C. and undergo extraction by a further addition of 2,800 milliliters of $CO_2$ at 3,000 psi and 22° C. At the end of this period, the molecular weights had increased to an $M_w$ of 9,400 and an $M_n$ of 5,100 with a molecular weight distribution, or PD of 1.8.

EXAMPLE III

The procedure of Example II was repeated except that the addition of $CO_2$ for extraction occurred through a valve in the bottom of the reactor. After 7 hours of heating, and after using for the phenol extraction about 2,900 milliliters of $CO_2$ at 3,000 psi and 22° C., a polymer sample was removed from the reactor at the end of this period and found to have an $M_w$ of 5,700 and an $M_n$ of 3,600 with a molecular weight distribution of 1.6. The vessel was resealed and allowed to continue polymerization for a further 6.5 hours at about 230° C., and the vessel contents were permitted to undergo extraction by the addition of a further 2,700 milliliters of $CO_2$ at 3,000 psi and 22° C. At the end of this period, the molecular weights of the polycarbonate product had increased to an $M_w$ of 11,000 and an $M_n$ of 5,800 with a molecular weight distribution of 1.9.

EXAMPLE IV

The procedure of Example II was repeated except that 0.10 gram of butyltin hydroxide oxide was used as the catalyst. After 3 hours of heating at 180° C. and about 1,800 milliliters of $CO_2$ at 3,000 psi and 22° C. used for phenol extraction, a polymer sample was removed from the reactor at the end of this period and found to have an $M_w$ of 2,600 and an $M_n$ of 2,000 with a molecular weight distribution of 1.3. The mixture was heated for a further hour at 180° C., and then the temperature raised to 230° C. and heating continued for a further 5 hours. During this period, about 1,500 milliliters of $CO_2$ at 3,000 psi and 22° C. were used for the phenol extraction. At the end of this period, the molecular weights had increased to an $M_w$ of 4,900 and an $M_n$ of 3,000 with a molecular weight distribution, $M_w/M_n$, of 1.6.

EXAMPLE V

The procedure of Example II was repeated except that the helical coil stirrer was replaced by two DISPERMAX® agitators (Autoclave Engineers) arranged such that one was near the bottom of the vessel with the other coaxially situated about 10 centimeters above it. To this reactor were added 19 grams of 4,4'-(1,4-phenylenebisisopropylidene) bisphenol (bisphenol P), 19 grams of 4,4'-hexafluoroisopropylidene bisphenol (bisphenol AF), 10 grams of poly(bisphenol A-b-dimethylsiloxane), $M_w$=115,000, 31 grams of diphenylcarbonate, and 0.1 gram of tetrabutyl ammonium tetraphenyl borate. After 2 hours of heating at 180° C. and a further 3 hours at about 230° C. during which time about 1,700 milliliters of $CO_2$ at 3,000 psi and 22° C. were used for the phenol extraction, a polymer sample was removed from the reactor and found to have an $M_w$ of 2,800 and an $M_n$ of 2,200 with a molecular weight distribution of 1.3. The reactants were heated for a further 6 hours at about 230° C. and extracted with 1,500 milliliters of $CO_2$ at 3,000 psi and 22° C. At the end of this period, a white friable foam filled the reactor, SEM analysis indicated a microcellular structure with a typical pore size of about 20 microns. The molecular weights of the polycarbonate product had increased to an $M_w$ of 7,100 and an $M_n$ of 3,800 with a molecular weight distribution of 1.8. GPC analysis showed no evidence of the added block copolymer, suggesting that as expected in the presence of the catalyst the polycarbonate block underwent transesterification, and was reduced in molecular weight and incorporated into the random copolymer of bisphenol P and bisphenol AF. The polydimethylsiloxane block was expected to remain intact and have some solubility in supercritical carbon dioxide providing steric stabilization of the polymer surface which resulted in the high surface area microcellular foam.

The polymer product was a copolymer of 4,4'-(1,4-phenylenebisisopropylidene)bisphenol and 4,4'-hexafluoroisopropylidene bisphenol, as confirmed by NMR spectroscopy, which NMR confirmed the presence of the siloxane.

This Example indicates that block copolymers of polycarbonates and polysiloxanes possess surface stabilizing properties and can be used in dispersion type systems.

EXAMPLE VI

To the reactor system of Example I were added 30 grams of bisphenol Z, 31 grams of diphenylcarbonate and 70 microliters of titanium butoxide. This formulation provided a molar ratio of diaryl carbonate to bisphenol of 1.3. After sealing the reactor and pressurizing with $CO_2$ to 2,980 psi, the vessel was heated at about 180° C. for 4 hours, during which time about 1,100 milliliters of $CO_2$ at 3,000 psi and 22° C. were used for extraction, and then the temperature was raised to 220° C. over 90 minutes and maintained at that temperature for about 6 hours, during which time about 1,200 milliliters of $CO_2$ at 3,000 psi and 22° C. were used for extraction, and then the temperature was raised to about 260° C. over the course of an hour and held at that temperature for about 3 hours, during which time about 1,200 milliliters of $CO_2$ at 3,000 psi and 22° C. were used for extraction, and then over 40 minutes the temperature was raised to 280° C. and held at that temperature for 1 hour, during which time about 150 milliliters of $CO_2$ at 3,000 psi and 22° C. were used for extraction. The product polymer was poly(4,4'-cyclohexylidene bisphenol)carbonate and had an $M_w$ of 8,300, an $M_n$ of 4,300, and a molecular weight distribution of 1.9.

EXAMPLE VII

The procedure of of Example VI was repeated with the same reactants and reagents except that 35.9 grams of diphenylcarbonate were used to provide a molar ratio of diaryl carbonate to bisphenol of 1.5. A shorter time-temperature profile was employed. The vessel was heated at about 180° C. for 2 hours, during which time about 1,000 milliliters of $CO_2$ at 3,000 psi and 22° C. were used for extraction, and then the temperature was raised to 220° C. over 90 minutes and then maintained at that temperature for about 3 hours, during which time about 800 milliliters of $CO_2$ at 3,000 psi and 22° C. were used for extraction, and then the temperature was raised to about 260° C. over the course of an hour and held at that temperature for about 2 hours, during which time about 600 milliliters of $CO_2$ at 3,000 psi and 22° C. were used for extraction, and then over 40 minutes the temperature was raised to 280° C. and held at that temperature for 1 hour, during which time about 360 milliliters of $CO_2$ at 3,000 psi and 22° C. were used for extraction. The product polymer was poly(4,4'-cyclohexylidene bisphenol)carbonate and had an $M_w$ of 4,500, an $M_n$ of 3,000, and a molecular weight distribution of 1.5. Also extracted was the excess diphenylcarbonate byproduct.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A process for the preparation of polycarbonates consisting essentially of the reaction of a bisphenol, an arylcarbonate and a catalyst, which reaction is accomplished by heating said bisphenol, said arylcarbonate and said catalyst, in the presence of supercritical carbon dioxide, and subsequently extracting byproducts with supercritical carbon dioxide.

2. A melt polycondensation process for the preparation of polycarbonates consisting essentially of the reaction of a bisphenol, an arylcarbonate and a polymerization catalyst, in the presence of supercritical carbon dioxide, and extracting the major byproduct phenol with supercritical carbon dioxide.

3. A process in accordance with claim 2 wherein the bisphenol is bisphenol A.

4. A process in accordance with claim 2 wherein the bisphenol is 4,4'-hexafluoroisopropylidene bisphenol, 1,4-phenylenebis isopropylidene bisphenol, 1-phenylethylidene bisphenol, 4,4'-cyclohexylidene bisphenol, 4,4'-cyclohexylidene-2,2'-dimethyl bisphenol, 4,4'-cyclohexylidene-2,2'-dimethyl bisphenol, 4,4'-isopropylidene-2,2'-dimethyl bisphenol, 1,2-diphenylethylidene bisphenol, 4,4'-(1-naphthyl ethylidene) bisphenol, 1,2-phenylenebisisopropylidene bisphenol, 4,4'-cycloheptylidene bisphenol, or 4,4'-(4-t-butylcyclohexylidene)bisphenol.

5. A process in accordance with claim 2 wherein the bisphenol is 4,4'-cyclohexylidene bisphenol, and wherein said arylcarbonate is diphenylcarbonate, dicresyl carbonate, bis(2-chlorophenyl)carbonate, the bis-phenyl-carbonates of hydroquinone, resorcinol, and 4,4'-dihydroxyldiphenyl, and the bisphenyl carbonates of bis(4-hydroxyaryl)-alkanes, bis (4-hydroxyaryl)-cycloalkanes, bis(4-hydroxyaryl)-ethers, bis(4-hydroxyaryl)-sulfides, or bis(4-hydroxyaryl)-sulfones.

6. A process in accordance with claim 2 wherein said heating is at a temperature of from about 180° C. to about 260° C.

7. A process in accordance with claim 2 wherein said heating is at a temperature of about 230° C.

8. A process in accordance with claim 2 wherein said catalyst is titanium tetraisopropoxide, butyltin hydroxide oxide, magnesium acetate, zinc acetate, antimony oxide, aluminum di(isopropoxide) acetoacetic ester chelate, tetraphenyl phosphonium tetraphenylborate, or tetramethyl ammonium tetraphenyl borohydride.

9. A process in accordance with claim 2 wherein the extracted byproduct is comprised of a mixture of phenol and diphenylcarbonate, and which phenol is present in a major amount of from about 60 to about 99 weight percent.

10. A process in accordance with claim 2 wherein the polycarbonate is poly(4,4'-hexafluoroisopropylidene bisphenol)carbonate, poly(4,4'-(1-phenylethylidene) bisphenol)carbonate, poly(4,4'-cyclohexylidene bisphenol) carbonate, poly(4,4'-cyclohexylidene-2,2'-dimethylbisphenol)carbonate, poly(4,4'-(1,4-phenylenebisisopropylidene)bisphenol)carbonate, poly(4,4'-isopropylidene bisphenol)carbonate, poly(4,4'-cycloheptylidene bisphenol)carbonate, poly(4,4'-diphenylmethylidene bisphenol)carbonate, poly(4,4'-(1,2-phenylenebisisopropylidene)bisphenol)carbonate poly(4,4'-(4-t-butylcyclohexylidene)bisphenol)carbonate, poly(4,4'-hexafluoroisopropylidene)bisphenol-co-4,4'-(1,4-phenylenebisisopropylidene)bisphenol)carbonate, poly(4,4'-isopropylidene)bisphenol-co-4,4'-(1,4-phenylenebisisopropylidene)bisphenol)carbonate, or poly(4,4'-isopropylidene)bisphenol-co-4,4'-(1,4-phenylenebisisopropylidene) bisphenol-co-4,4'-hexafluoroisopropylidene)bisphenol)carbonate, and wherein said polycarbonate possesses an $M_n$ of between about 4,000 and about 150,000 Daltons, and an $M_w$ of between about 10,000 and about 250,000 Daltons.

11. A process in accordance with claim 5 wherein the polycarbonate is poly(4,4'-hexafluoroisopropylidene bisphenol)carbonate, poly(4,4'-(1-phenylethylidene) bisphenol)carbonate, poly(4,4'-cyclohexylidene bisphenol) carbonate, poly(4,4'-cyclohexylidene-2,2'-dimethylbisphenol)carbonate, poly(4,4'-(1,4-phenylenebisisopropylidene)bisphenol)carbonate, poly(4,4'-isopropylidene bisphenol)carbonate, poly(4,4'-cycloheptylidene bisphenol)carbonate, poly(4,4'-diphenylmethylidene bisphenol)carbonate, poly(4,4'-(1,2-phenylenebisisopropylidene)bisphenol)carbonate poly(4,4'-(4-t-butylcyclohexylidene)bisphenol)carbonate, poly(4,4'-hexafluoroisopropylidene)bisphenol-co-4,4'-(1,4-phenylenebisisopropylidene)bisphenol)carbonate, poly(4,4'-isopropylidene)bisphenol-co-4,4'-(1,4-phenylenebisisopropylidene)bisphenol)carbonate, or poly(4,4'-isopropylidene)bisphenol-co-4,4'-(1,4-phenylenebisisopropylidene)bisphenol-co-4,4'-hexafluoroisopropylidene)bisphenol)carbonate, and wherein said polycarbonate possesses an $M_n$ of between about 4,000 and about 150,000 Daltons, and an $M_w$ of between about 10,000 and about 250,000 Daltons.

12. A process in accordance with claim 2 wherein the diaryl carbonate is employed at 1 to 1.5 molar excess with respect to the molar concentration of the bisphenol added; the catalyst amount is between about 0.05 and about 3 weight percent of the total bisphenol added; and the volume of carbon dioxide by weight of bisphenol ratio is about 100 to about 10,000 when the carbon dioxide is at 3,000 psi and 22° C.

13. A process in accordance with claim 1 wherein the polycarbonate $M_w$ is from about 10,000 to about 250,000 Daltons, and wherein said Daltons were determined by gel permeation chromatography in tetrahydrofuran against polystyrene standards.

14. A process in accordance with claim 1 wherein the polycarbonate $M_n$ is between about 4,000 and 150,000 Daltons, and wherein said Daltons were determined by gel permeation chromatography in tetrahydrofuran against polystyrene standards.

15. A supercritical carbon dioxide melt condensation process for the preparation of a polycarbonate which comprises adding at least one bisphenol, a diaryl carbonate and a catalyst to a pressure vessel; adding carbon dioxide at pressures of between about 2,500 psi to about 10,000 psi; heating the resulting mixture; stirring the mixture; adding carbon dioxide through one vessel port as carbon dioxide is removed at another second vessel port primarily to maintain a pressure of from about 2,500 to about 10,000 psi, and depressurizing said removed carbon dioxide through a small orifice, and wherein the reaction byproduct phenol is removed.

16. A process in accordance with claim 15 wherein from 1 to 3 bisphenols are selected and stirring is for a period of from about 6 to about 12 hours at a stirring speed of from about 20 to about 400 rpm.

17. A process in accordance with claim 15 wherein one bisphenol is selected.

18. A process in accordance with claim 15 wherein heating is from between about 180° C. and about 250° C.

19. A process in accordance with claim 15 wherein after the reaction byproduct phenol separates from the carbon dioxide gas, there is accomplished continuously heating, stirring and extracting the phenol and excess diphenylcarbonate until the polymer $M_w$ is from about 10,000 to about 250,000 Daltons, and the polymer $M_n$ is between about 4,000 and about 150,000 Daltons, followed by depressurizing the vessel and recovering the polymer.

20. A process in accordance with claim 15 wherein the catalyst is tetramethyl ammonium tetraphenyl borohydride.

21. A process in accordance with claim 15 wherein there are selected 100 parts of bisphenol, 130 parts of diphenylcarbonate, and 0.3 part of catalyst.

22. A process in accordance with claim 15 wherein small is from about 20 to about 100 microns.

23. A process in accordance with claim 15 wherein the carbon dioxide is at pressures of between about 2,500 psi to about 4,500 psi.

24. A supercritical carbon dioxide melt condensation process for the preparation of a polycarbonate which comprises adding bisphenol, a diaryl carbonate and a catalyst to a pressure vessel; adding carbon dioxide at pressures of between about 2,500 psi to about 10,000 psi; heating said mixture to between about 180° C. and about 250° C.; stirring the mixture; adding carbon dioxide through one vessel port as carbon dioxide is removed at another port primarily to maintain the same pressure; and wherein removed carbon dioxide is depressurized through a small orifice and the reaction byproduct phenol separates from the carbon dioxide gas; continuously heating, stirring and extracting until the desired polymer molecular weight is achieved; depressurizing the vessel and recovering the polymer.

25. A process in accordance with claim 2 wherein the polycarbonate is poly(4,4'-hexafluoroisopropylidene) bisphenol-co-4,4'-(1,4-phenylenebisisopropylidene bisphenol)carbonate.

26. A process in accordance with claim 2 wherein the reaction is accomplished with heating and cooling.

27. A process in accordance with claim 10 wherein the $M_n$ and $M_w$ are determined by gel permeation chromatography in tetrahydrofuran against polystyrene standards.

28. A process for the preparation of polycarbonates obtained from the reaction of a bisphenol, an arylcarbonate and a polymerization catalyst, the improvement residing in accomplishing said reaction in the presence of supercritical carbon dioxide and extracting the byproduct phenol subsequent to obtaining said polycarbonate, and which extraction is accomplished with supercritical carbon dioxide.

* * * * *